by evaporation. The impregnation can be carried out at ordinary or elevated temperatures for various lengths of time. The time of treatment should at least be sufficient to produce uniform impregnation. Usually periods of 5 to 15 minutes are sufficient; however longer times, for example, up to several hours or more, are also operable.

Another method of forming the compositions involves dissolving the hypophosphorous acid compound in a solution of the hydroxylated polymer in a solvent such as water, water-alcohol mixtures, and the like. In this embodiment the desired amount of hypophosphorous compound is blended into the solution of the hydroxylated polymer and after a uniform composition is obtained the solution is formed into the desired state, e. g., films, fibers, etc., and the solvent removed by evaporation. This embodiment is particularly well suited for the treatment of water-soluble polyvinyl alcohol.

The invention is illustrated by the following examples in which the proportions of ingredients are expressed in parts by weight unless otherwise noted.

Example I

A solution containing 16.7% polyvinyl alcohol is prepared by dissolving 20 parts of polyvinyl alcohol (about 51% hydrolyzed, high viscosity, polyvinyl acetate) in 100 parts of a mixture consisting of 80% ethanol (by volume) and 20% water. Fifty parts of this solution is then mixed with 16.7 parts of a 5% solution of the diphenyl ester of benzenephosphonous acid, $$C_6H_5P(OC_6H_5)_2$$

(also known commercially as diphenyl phenylphosphinate) in 95% ethanol. Films are cast from the resulting uniform solution and air-dried at room temperature. Strips of the films are baked in an oven at 225° C. together with strips of a control film prepared in the same manner from polyvinyl alcohol solutions containing no hypophosphorous acid compound. After one minute at 225° C., the film containing the diphenyl ester of benzenephosphonous acid is unchanged in color, whereas the control has turned yellow. The color difference is even more pronounced after 5 minutes heating at 225° C.

Example II

To 16 parts of the 16.7% polyvinyl alcohol solution of Example I is added 0.27 part of sodium hypophosphite, H₂P(:O)ONa. After mixing until uniform, the solution is cast into a film which is air-dried at room temperature as in the preceding example. The dry film is then heated in an oven at 225° C. together with a control film containing no sodium hypophosphite. After 5 minutes at this temperature the film containing sodium hypophosphite is colorless, whereas the control film is dark yellow.

Example III

Five parts of polyvinyl alcohol (87% hydrolyzed, low viscosity polyvinyl acetate) is dissolved in 45 parts of water. Into this solution is uniformly blended 0.5 part of a 50% aqueous solution of hypophosphorous acid, H₂P(:O)OH. The resulting clear, colorless solution is poured in a thin layer onto a glass plate, and the resulting film heated at 150° C. A control film cast from the same polyvinyl alcohol but containing no hypophosphorous acid is prepared and heated under the same conditions. The film containing hypophosphorous acid remains colorless for 90 minutes and is no yellower at the end of 4 hours heating at 150° C. than is the control film at the end of 45 minutes heating at the same temperature.

Example IV

A sample of wet-spun, drawn and relaxed yarn prepared from a hydrolyzed copolymer of ethylene and vinyl acetate (of about 5% ethylene content based on the weight of hydrolyzed material, and prepared as described in U. S. Patent 2,386,347) is wound on a small glass tube. The tube with supported yarn is immersed for 10 minutes in a 10% aqueous solution of sodium hypophosphite, after which it is dried in air at room temperature. The dry, treated yarn is then immersed in an oil bath heated at 212° C. for 10 minutes. After this treatment the yarn is only slightly discolored, whereas a sample of control yarn containing no sodium hypophosphite is colored yellow by the same treatment at 212° C. in oil.

The hydroxylated polymers used in the practice of this invention comprise macro-molecular synthetic polymers having at least one alcoholic hydroxyl group for 20 carbon atoms and no more than one hydroxyl for 2 carbon atoms. By "macro-molecular" is meant an organic compound having a degree of polymerization, or a number of recurring units, of at least 100 (Staudinger, die Hochmolekularen Organischen Verbindugen, 1932). Such hydroxyl-containing polymers include polyvinyl alcohol and other linear hydrolyzed polyvinyl ester polymers and copolymers in which the extent of hydrolysis is sufficient to give the hydroxyl compound previously mentioned. In addition to the hydrolyzed polyvinyl esters such as polyvinyl acetate, hydrolyzed copolymers of vinyl esters with ethylene, vinyl chloride, vinyl fluoride, vinylidene fluoride, vinylidene chloride and other polymerizable organic materials can be employed. In such copolymers the molar ratio of vinyl ester, hydrolyzed to vinyl alcohol) to the other polymerizable compound must be at least 1:20 and is preferably between 6:1 and 50:1.

The hypophosphorous compounds illustrated by this acid and the derivatives mentioned in the examples can be replaced by other derivatives comprising the inorganic salts and organic derivatives previously mentioned. The ammonium and alkali and alkaline metal salts such as potassium, calcium, magnesium, barium and ammonium hypophosphites are particularly useful. The organic derivatives include the monoalkyl and monoaryl phosphinic acids which have the formula

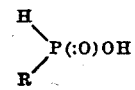

wherein R is an alkyl or an aryl radical, e. g., phenylphosphinic, p-tolylphosphinic and hexylphosphinic acids; salts of these acids and of the isomeric phosphonous acids (having the formula RP(OH)₂, wherein R is an alkyl or an aryl radical) such as sodium phenylphosphinate, potassium phenylphosphinate, calcium phenylphosphinate, magnesium hexylphosphinate, the sodium salt of benzenephosphonous acid, and the like. Examples of suitable alkyl and aryl esters of these phosphonous and phosphinic acids are the diphenyl ester of benzenephosphonous acid, butyl phenylphosphinate, ethyl hexylphosphinate, and the like. These hypophosphorous acid

Certificate of Correction

Patent No. 2,516,980                                        August 1, 1950

HUGH W. GRAY ET AL.

It is hereby certified that error appears in the printed specification of the above numbered patent requiring correction as follows:

Column 4, line 43, strike out the comma after "ester" and insert an opening parenthesis before the syllable "hydro";

and that the said Letters Patent should be read as corrected above, so that the same may conform to the record of the case in the Patent Office.

Signed and sealed this 24th day of October, A. D. 1950.

[SEAL]

THOMAS F. MURPHY,
*Assistant Commissioner of Patents.*